Dec. 8, 1959  D. J. CHRISTENSON  2,916,189
FERTILIZER SPREADER METERING AND FLUSHING DEVICE
Filed Jan. 30, 1957  2 Sheets-Sheet 1
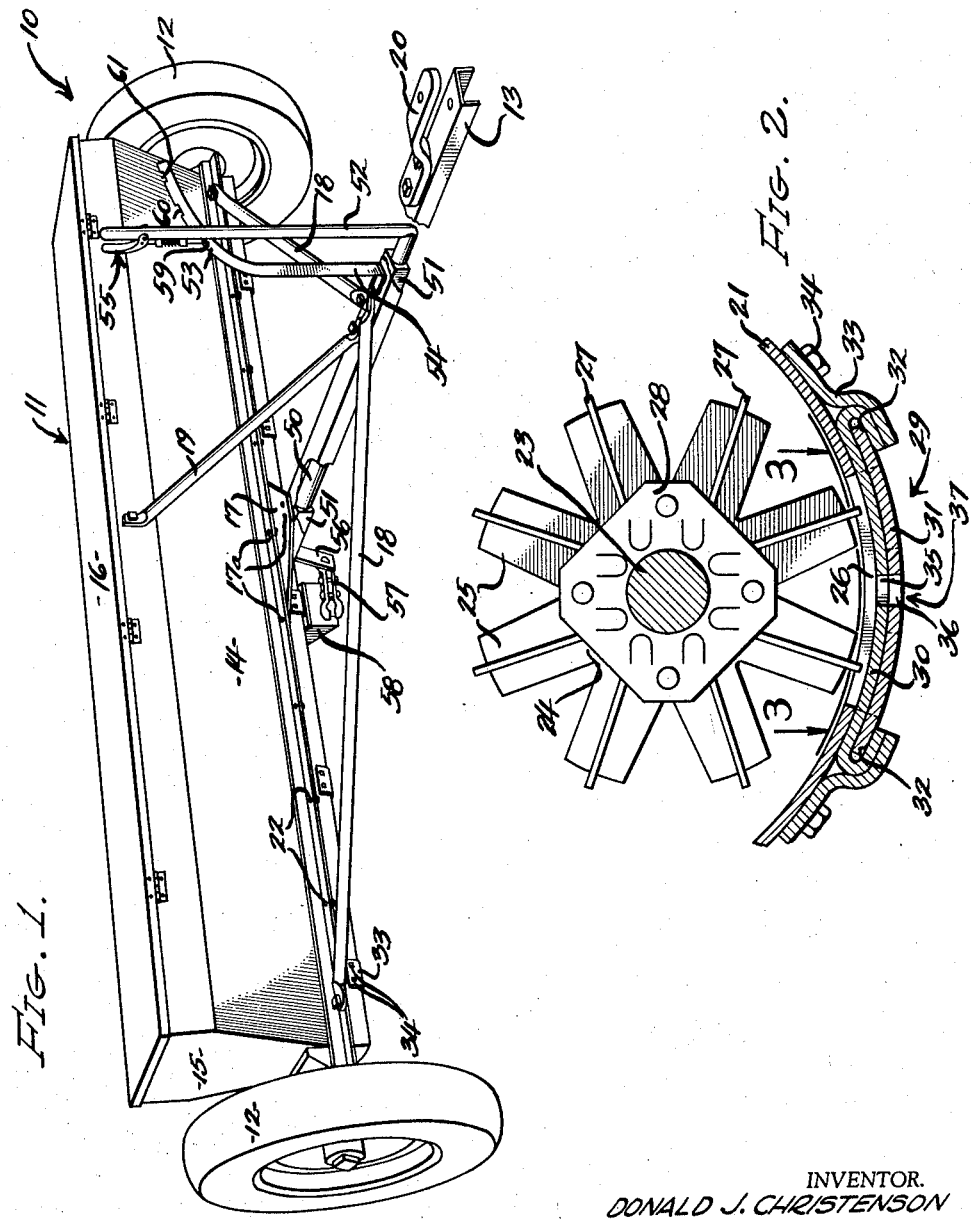
INVENTOR.
DONALD J. CHRISTENSON
BY
Emerson B Donnell
ATTORNEY Dec. 8, 1959     D. J. CHRISTENSON     2,916,189
FERTILIZER SPREADER METERING AND FLUSHING DEVICE
Filed Jan. 30, 1957     2 Sheets-Sheet 2
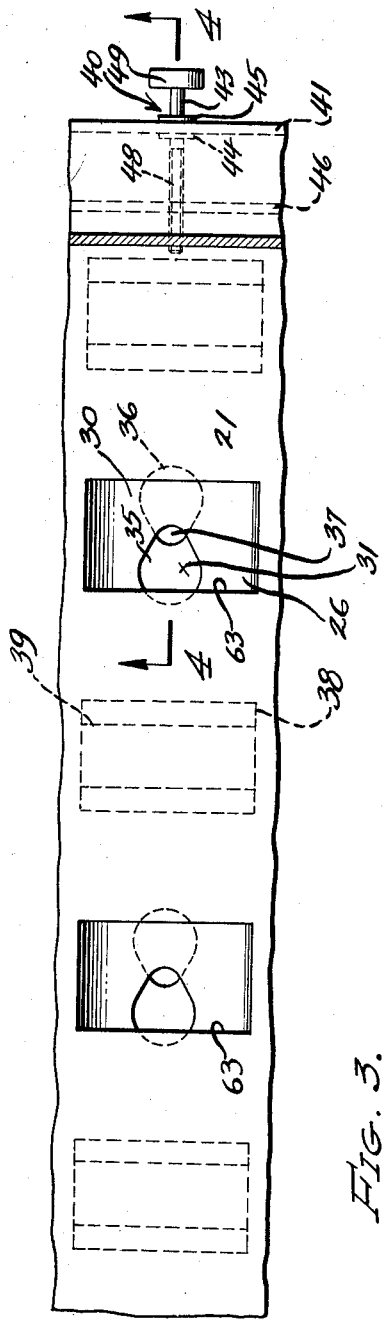
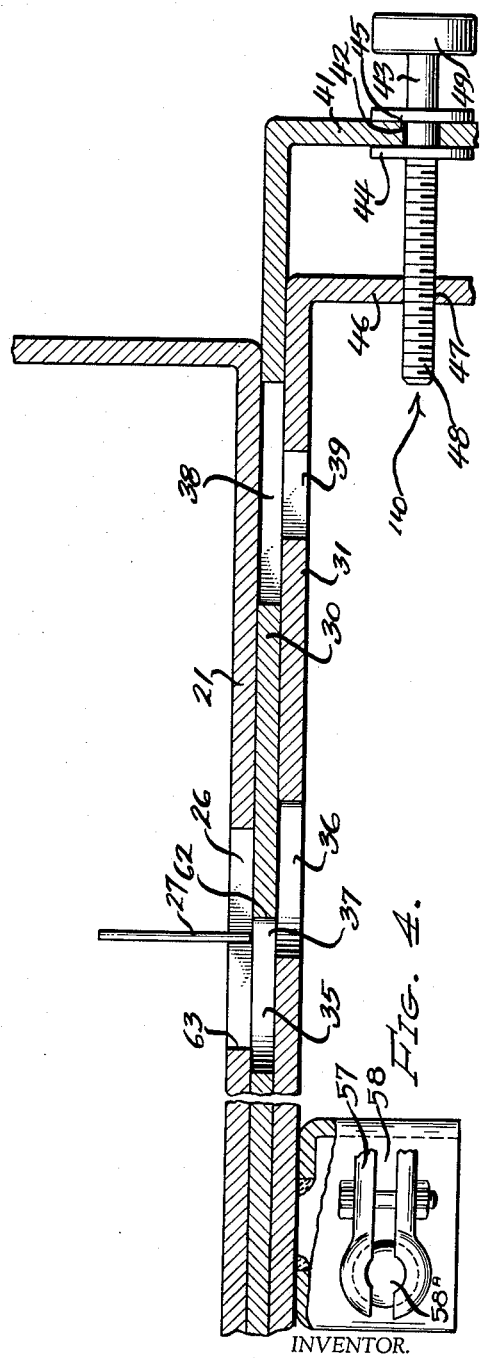
INVENTOR.
DONALD J. CHRISTENSON
BY
Emerson B Donnell
ATTORNEY

United States Patent Office 2,916,189
Patented Dec. 8, 1959

2,916,189

FERTILIZER SPREADER METERING AND FLUSHING DEVICE

Donald J. Christenson, Kansasville, Wis., assignor to J. I. Case Company, Racine, Wis., a corporation of Wisconsin Application January 30, 1957, Serial No. 637,263

8 Claims. (Cl. 222—484)

The present invention relates to a spreader for material such as fertilizer, and more specifically to a novel arrangement of discharge apertures and flush openings which are shiftable into predetermined relation to the discharge port formed in the hopper bottom of the spreader.

Fertilizer spreaders of the type now generally in use ordinarily employ means for alternately charging and penetrating a discharge port formed in the hopper bottom. The penetrating means is constrained to move adjacent a substantially straight edge of the discharge port and a shiftable shutter is provided which has formed therein a discharge aperture which is located in registerable relationship to the straight edge of the hopper discharge port so that an effective discharge opening can be formed by moving the shutter sufficiently in one direction to cause the discharge port and aperture to move into registering relation. In the event the discharge port in the hopper bottom becomes compacted or stratified with fertilizer material to the extent that this material is hindering the normal operation of the machine, it is usually necessary to shift the shutter to an extent sufficient to form the maximum effective discharge opening so that the stratified material in the hopper discharge port can be driven through the effective discharge opening. It will be appreciated, however, that if for instance, the machine were set for dispensing only 50 pounds of fertilizer per acre, the effective discharge opening for dispensing this small amount of material would be very small. Since it is extremely difficult, if not impossible, in these present machines to accurately readjust the shutter to any pre-determined position after the original setting has been interfered with, like for instance when the machine is put into transport position or when the hopper discharge ports must be flushed of stratified material, the amount of material dispensed by the machine after readjustment of the shutter will vary from the 50 pounds per acre adjustment in effect prior to shifting the shutter.

The present invention contemplates a metering element which is slidably supported relative to the hopper bottom. The metering element is comprised of a plurality of slidably supported shutters and each shutter has formed therein a discharge port which is located in cooperative relationship so as to form an effective discharge opening relative to the discharge ports formed in the hopper bottom. Each of the shutters has also formed therein a flush port which is located in aligned relationship and can be moved, upon the metering element's being shifted in one direction, into alignment with the discharge port formed in the hopper bottom whereby the hopper bottom discharge port can be flushed of any stratified material contained therein without interfering with the setting of the effective discharge opening. Means are also provided whereby the metering element can be slidably adjusted relative to the hopper bottom into predetermined adjusted positions and whereby one of the shutters can be slidably adjusted relative to the other shutter for accurately defining the size of the effective discharge opening for accurately determining the amount of fertilizer dispensed by the machine.

It is, therefore, a primary object of the present invention to generally improve the operation and construction of spreading machines of this type.

The penetrating means used in the past has sometimes become misaligned and seriously damaged the edge of the discharge port and, accordingly, another object is to provide an arrangement wherein the penetrating means may traverse the middle of the discharge port rather than run adjacent one edge thereof.

A further object of the present invention is to provide a material spreader having a novel arrangement of discharge ports through which material is dispensed.

A still further object of the present invention is to provide a material spreader having a novel arrangement of discharge ports and flush ports whereby the predetermined size of the effective discharge opening through which material is dispensed is not changed or disturbed upon the machine's being positioned from its operative position into its transport position or upon the flush ports' being moved into alignment with the hopper bottom discharge ports.

Another object of the present invention is to provide a metering element comprising a plurality of shutters which are slidable relative to each other and into predetermined adjusted positions for regulating the effective discharge openings formed by cooperative discharge ports and which are adjustable in unison without disturbing the size of the effective discharge openings.

Yet another object of the present invention is to provide a material spreader embodying the principles of the present invention which is economical to manufacture and highly efficient in operation.

With these and other objects in view, the invention may consist of certain novel features of construction and operation as will be more fully described and particularly pointed out in the description, drawings and claims appended hereto.

In the drawings:

Fig. 1 is a perspective view of a material spreader embodying the principles of the present invention, with parts broken away to show details of construction.

Fig. 2 is an enlarged vertical sectional view of a spreader hopper disclosed in Fig. 1, with parts broken away.

Fig. 3 is a sectional view taken on the line 3—3 of Fig. 2, somewhat reduced, and with parts broken away.

Fig. 4 is a vertical sectional view taken on the line 4—4 of Fig. 3, considerably enlarged, and with parts broken away.

Referring to the drawings, a fertilizer spreader embodying the principles of the present invention is broadly indicated by the number 10, and generally comprises a hopper 11, a pair of support wheels 12, and a draw bar 13 for draft connecting the fertilizer spreader with a propelling vehicle.

The hopper 11 is preferably of fabricated construction and generally in the form of a rigid box having a pair of side members 14, only one of which is visible, a pair of end members 15, only one of which is visible, and a hingedly connected lid 16. The box is suitably movably supported by the transport wheels at its opposite ends in elevated position with respect to the ground, and the draw bar 13 is rigidly fixed to the hopper by an inter-connecting plate 17 and bolts 17a so as to extend forwardly therefrom. The draw bar 13 is suitably braced by diagonal brace members 18 and by a center brace member 19 in a manner well known in the art, and the forward end of the draw bar has a suitable clevis 20 secured thereto for permitting easy interconnection with a propelling vehicle for effecting movement of the fertilizer spreader over the ground.

Referring now particularly to Figs. 2, 3, and 4, of the drawings, the side and end members 14 and 15 of the hopper box have fixed thereto a hopper bottom 21 by suitable bolts 22 so as to form a fully enclosed fertilizer box. A rotatable shaft 23 is positioned in the hopper box, and rigidly fixed to the shaft so as to turn therewith are a plurality of disk-shaped members 24 which are formed of rigid sheet metal and which have formed thereon a plurality of radially extending arms 25. The radially extending arms 25 of each disk-shaped member 24 lie in a common plane substantially normal to the axis of shaft 23, and the path of travel of the individual arms 25 of each member 24 about the axis of the shaft is eccentric with the curvature of the hopper bottom 21. The arms 25 are each formed of such a length that they will not penetrate into an associated discharge port 26 formed in the hopper bottom 21 as will be more fully understood hereinafter. Each of the arms 25 has associated therewith a finger 27 which is formed of flexible spring steel and which extends beyond the end of its associated arm 25 a distance sufficient to penetrate into the associated discharge port 26 upon rotation of the shaft 23. The fingers 27 are retained in position relative to their respective arms 25 by a retainer plate 28. The specific construction of these disk-shaped members, its method of charging its associated discharge port and its penetrating means for penetrating its associated discharge port so as to drive the material therein through the effective discharge opening, which will be more clearly understood hereinafter, forms no part of the present invention and the specific construction of member 24, fingers 27, and retainer plate 28 are clearly disclosed and claimed in United States Letters Patent No. 2,772,030, dated November 27, 1956.

As will be fully appreciated hereinafter, any means for alternately filling the discharge port with fertilizer material and penetrating the port can be utilized in combination with the principles of the present invention.

As previously suggested, a discharge port 26 is formed in the hopper bottom 21 in association with each discharge member 24. Each of the discharge ports 26 in the present instance is substantially rectangular in shape with the long axis substantially normal to the center line of the hopper bottom. Each discharge port is so located relative to its discharge member 24 that the path of travel of the spring fingers 27 through this discharge port will substantially bisect the width of the port. It will also be appreciated that each of the discharge ports is so located relative to its respective member 24 that the fingers 27 will reach their maximum penetration of the respective discharge port at a point substantially midway of the length of the port.

A metering element generally designated as 29 is slidable along the under side of the hopper bottom 21 and comprises a pair of shutters 30 and 31 which are held in relative sliding relationship with respect to one another. The shutter 30 is positioned in sliding relationship with respect to the under side of hopper bottom 21 and its opposite side edges are so bent as to form a slide rack 32 for carrying the shutter 31 in sliding relationship with respect to the underside of shutter 30. The metering element 29 is held in sliding relationship to the underside of hopper bottom 21 by a plurality of curved slide elements 33 which are fixed by bolts 34 in spaced relationship along the front and back side of the hopper and which slidably receive the metering element 29. It will be appreciated, therefore, that the metering element is slidably supported relative to the under side of the hopper bottom and that the respective shutters 30 and 31 are slidably supported for movement relative to each other.

The shutter 30 has formed therein a plurality of spaced discharge ports 35, each of which is registerable with its associated discharge port 26 formed in the hopper bottom. The shutter 31 has formed therein a plurality of spaced discharge ports 36 each of which is registerable with its associated discharge port 26 formed in the hopper bottom as well as with its associated discharge port 35 formed in the shutter 30. Each of the discharge ports 35 and 36 is preferably pear shaped in configuration and each set of cooperating discharge ports 35 and 36 is so arranged that the small substantially pointed ends move into registerable relationship when the shutter 30 is moved in one direction relative to the shutter 31. It will be appreciated, therefore, that when the discharge ports 35 and 36 are moved into registerable relationship, an effective discharge opening 37 can be formed which can be adjusted in size from a very small opening to an opening roughly equivalent to the size of the discharge port 36 when the discharge ports 35 and 36 are in complete alignment with each other. It will also be appreciated that the effective discharge openings 37 are located in alignment with their associated discharge port 26 adjacent the path of travel of the penetrating fingers 27 so that the material in the associated discharge port 26 will be driven through the effective discharge openings 37 regardless of the size of said openings, upon rotation of the shaft 23. The ports 35 and 36 are so located with respect to their associated ports 26 in the hopper bottom that the penetrating fingers achieve their maximum penetration adjacent the area of their associated effective discharge opening 37. Also, as previously suggested, the penetrating fingers 27 are each formed of such length that they will not penetrate into the discharge ports 35 formed in shutter 30, which it will be appreciated, would prevent relative movement of the metering element 29 with respect to the hopper bottom 21.

The shutter 30 has also formed therein a plurality of flush openings 38 and the shutter 31 has also formed therein a plurality of flush openings 39 of less width than the flush openings 38 formed in shutter 30. A flush opening 39 is associated with each flush opening 38 and the width of each flush opening is so determined that the respective associated openings 38 and 39 will always be positioned in alignment irrespective of the size of the effective discharge openings 37. When the metering element 29 is shifted in one direction, for instance to the left as disclosed in Fig. 4, the aligned flush openings 38 and 39 associated with each discharge port 26 formed in the hopper bottom can be moved into alignment with said associated discharge port 26 so that said port can be flushed of any fertilizer which has tended to become compacted in said port.

As previously suggested, the shutters 30 and 31 are slidable relative to each other for adjusting the effective openings 37 of associated discharge ports 35 and 36. This is effected by an adjusting screw 40 which is rotatably carried while being held against axial movement by a depending flange 41 formed at one end of shutter 30. More specifically, the flange 41 has formed therein an opening 42 for rotatably receiving a shank 43 of screw 40 and suitable washers 44 and 45 are fixed as by welding to the shank 43 adjacent opposite sides of flange 41. The shutter 31 has a depending flange 46 located adjacent flange 41 and an opening 47 is formed therein for threadedly receiving a threaded portion 48 of adjusting screw 40. It will be appreciated, therefore, that by turning the adjusting screw 40 by turning a knob 49, the shutter 30 can be slidably adjusted relative to the shutter 31 when shutter 31 is held against sliding movement, as will be more fully described hereinafter, in either direction so as to accurately control the size of the effective openings 37 formed by associated discharge ports 35 and 36.

To shift the metering element 29 relative to the hopper bottom, a rock shaft 50 is rotatably carried in suitable bearings 51 by the draw bar 13. One leg of the rock shaft 50 is in the form of an adjusting lever 52 which is swingable side-to-side in lockable relationship with respect to a notched rack or quadrant 53. The rack is carried by a standard 54 which in turn is fixed in any suitable manner in relation to the draw bar 13. A suitable detent mechanism 55 is associated with the lever for locking the lever in predetermined adjusted positions with respect to the rack 53 as will be more fully appreciated hereinafter.

Another leg 56 of the rock shaft 50 is connected to one end of a pitman 57, the other end of which is connected to the under side of the shutter 31 by a suitable bracket 58 welded or otherwise fixed to shutter 31 as best seen in Fig. 4, and having a ball or pivot connection 58a engaged by pitman 57 so that the metering element 29 is movable in sliding relationship with respect to the hopper bottom in one direction, for instance to the left, upon the rock shaft's being rocked in one direction, for instance to the right, or vice versa.

The metering element is shiftable relative to the hopper bottom into three positions as determined by notches 59, 60, and 61 formed on rack 53, and the parts are so proportioned and adjusted that, when the lever is located, by detent mechanism 55, in locked relation to notch 59 the metering element is so located that the associated discharge ports 35 and 36 are in alignment with their associated discharge ports 26 formed in the hopper bottom and the fertilizer spreader is in operative condition, as shown in Fig. 4. The effective discharge opening formed by the discharge ports 35 and 36 is determined by the adjusting screw and can be set for dispensing a relatively heavy amount of fertilizer or for dispensing relatively little fertilizer. The shutter 31 is held against sliding movement when adjusting screw 40 is turned, by its interconnection, by pitman 57, with leg 56 of rock shaft 50 and by locking of adjusting lever 52 by detent mechanism 55 in notch 59 of rack 53.

When the rock shaft is rocked by the lever arm and the latter locked in notch 60 by the detent mechanism 53, the metering element is shifted to the left as viewed in Fig. 4, sufficiently to move the pointed end 62 of each of the discharge ports 35 slightly to the left of the edges 63 of the associated discharge ports 26 formed in the hopper bottom. However, the metering element is not shifted sufficiently to move the aligned flushing ports 38 and 39 into flushing alignment with the associated discharge ports 26. In this position the spreader can be transported without dispensing any fertilizer.

When the rock shaft is rocked by the lever arm to the extent that the same can be locked by detent mechanism 55 in notch 61, the metering element is shifted to the left as viewed in Fig. 4 a distance sufficient to move the aligned flushing ports 38 and 39 into alignment with the associated discharge ports 26 formed at the hopper bottom. In this position and as previously suggested, the discharge port can be flushed of any material which has tended to become compacted therein.

In reviewing the principles of the present invention, it will be appreciated that a metering element is provided which is movable along the hopper bottom and which comprises a first shutter which has a discharge port adapted to register in varying degrees with the discharge port formed in the hopper bottom and a flush opening which is spaced from the discharge port, and a second shutter which also has a discharge port adapted to register in varying degrees with the discharge port formed in the first shutter and a flush opening which is positioned in alignment with the flush opening formed in the first shutter. Adjustable means are provided by interconnecting the first and second shutters and for shifting one of the shutters relative to the other shutter so that the effective discharge opening can be formed of any desired predetermined size. Means are also provided whereby the metering element can be moved relative to the hopper bottom of the spreader so as to put the spreader into either operative position, transport position, or a position wherein the fertilizer material compacted in the hopper discharge port can be flushed through the aligned flush openings.

It will be appreciated that once the size of the effective discharge openings 37 has been determined the metering element can be shifted to an extent sufficient to either put the machine into transport position or to flush the material compacted in the hopper discharge ports through the aligned flush openings without disturbing to any extent the original setting of the effective discharge openings.

While the present invention is directed primarily to the arrangement of discharge ports and flush openings in the metering element, it will be appreciated that the wheels 12 are preferably drivingly connected with the shaft 23 whereby a pre-determined distribution of the material would be dispensed irrespective of the speed of travel of the spreader. Also, while the present invention has been primarily described with respect to the dispensing of material such as fertilizer, and particularly that type of fertilizer which has a tendency to clog and form a film across the discharge ports formed in the hopper bottom, the invention is also applicable for the dispensing of materials such as the seeds of grains, grasses, and legumes.

What is claimed is:

1. In combination with a spreader including a hopper having a discharge port formed in the bottom thereof, a first shutter movable relative to said hopper bottom and having an aperture adapted to register with said discharge port, a second shutter movable relative to said first shutter and having an aperture adapted to register in varying degrees with the aperture formed in said first shutter so as to form an effective discharge opening, single adjustable means connected with both said shutters for regulating the size of the effective discharge opening formed by said registrable apertures, and separate means connected with said shutters for simultaneously shifting both said shutters relatively to said hopper.

2. In combination with a material spreader having a hopper with a discharge port formed in the bottom thereof, a metering element comprising juxtaposed movable shutters having a pair of discharge apertures which are registrable in varying degrees so as to form an effective discharge opening of varying size and a pair of registerable flush openings spaced from said discharge apertures, and means for adjustably moving said metering element relative to said discharge port whereby said spreader can be put into operative position wherein said discharge opening registers with said discharge port, transport position, wherein said discharge opening fails to register with said discharge port and is closed, or a position wherein said discharge port registers with said flush openings.

3. A material spreader including a hopper having a discharge port formed therein, penetrating means for penetrating said discharge port and constrained to move in a path substantially across the center of said discharge port, a first shutter movable relative to said hopper bottom and having an aperture formed therein, a second shutter movable relative to said first shutter and having an aperture formed therein registrable with the first mentioned aperture in varying degrees so as to form an effective discharge opening, adjustable means connected between said first and second shutters for holding said shutters in pre-determined adjusted positions relatively to each other whereby the amount of material dispensed by said spreader can be adjusted by regulating the size of the effective discharge opening, and separate means for shifting said shutters simultaneously whereby said discharge opening may be aligned with said penetrating means.

4. In combination with a spreader including a hopper having a discharge port formed in the bottom thereof a first shutter movable relative to said hopper bottom and having a discharge aperture and a flush opening formed therein in spaced relation, a second shutter movable relative to said first shutter and having formed therein a discharge aperture adapted to register in varying degrees with the first mentioned aperture so as to form an efective discharge opening, and a flush opening located in registration with the first mentioned flush opening, means for adjustably interconnecting said first and second shutters, and separate means for shifting said shutters in unison from a position wherein said effective discharge opening is located in registration with said discharge port to a position wherein said registered flush openings are located in registration with said discharge port.

5. The invention defined in claim 4, wherein one of said flush openings is of such size as to remain in registration with the other of said flush openings regardless of the size of said effective discharge opening.

6. The invention defined in claim 4, wherein said discharge apertures are so spaced from their respective flush openings as to permit said shutters to be moved in unison into transport position relative to said discharge port wherein no opening is in register with said discharge port.

7. In combination with a spreader including a hopper having a discharge port formed in the bottom thereof a first shutter movable relative to said hopper bottom and having a discharge aperture and a flush opening formed therein in spaced relation, a second shutter movable relative to said first shutter and having formed therein a discharge aperture adapted to register in varying degrees with the first mentioned aperture so as to form an effective discharge opening, and a flush opening located in registration with the first mentioned flush opening, means adjustably interconnecting said first and second shutters for shifting them relatively to each other for adjusting said discharge opening, and a rock shaft having one leg interconnected with one of said shutters and another leg in the form of a lever arm whereby said shutters can be moved in unison relative to said hopper.

8. In combination with a spreader including a hopper having a discharge port formed in the bottom thereof a first shutter movable relative to said hopper bottom and having a discharge aperture and a flush opening formed therein in spaced relation, a second shutter movable relative to said first shutter and having formed therein a discharge aperture adapted to register in varying degrees with the first mentioned aperture so as to form an effective discharge opening, and a flush opening located in registration with the first mentioned flush opening, means adjustably interconnecting said first and second shutters for shifting them relatively to each other for adjusting said discharge opening, and a rock shaft having one leg interconnected with said second shutter and another leg in the form of a lever arm whereby said shutters can be moved in unison relative to said discharge port from an operative position wherein said discharge opening registers with said discharge port, to a transport position wherein no opening registers with said discharge port, to a position wherein said discharge port is in alignment with said flush openings.

References Cited in the file of this patent

UNITED STATES PATENTS

| 19,871 | Risher | Apr. 6, 1858 |
| 971,479 | Wegner | Sept. 27, 1910 |
| 1,172,005 | Butterfield | Feb. 15, 1916 |
| 2,768,773 | Bjerre | Oct. 30, 1956 |